United States Patent [19]

Verstockt

[11] Patent Number: 5,734,372
[45] Date of Patent: Mar. 31, 1998

[54] MONITOR CURSOR CONTROLLING DEVICE PROVIDED WITH SIGNALING ELEMENT

[75] Inventor: Kris Verstockt, Antwerp, Belgium

[73] Assignee: Primax Electronics Ltd., Taipei Hsien, Taiwan

[21] Appl. No.: 638,954

[22] Filed: Apr. 24, 1996

[51] Int. Cl.$^6$ ............................................. G09G 5/08
[52] U.S. Cl. .................... 345/163; 345/157; 345/145; 340/825.17; 340/815.45
[58] Field of Search .......................... 345/145, 156, 345/157, 163; 340/815.45, 825.17, 825.06

[56] References Cited

U.S. PATENT DOCUMENTS

| 5,145,179 | 9/1992 | Tokunaga | 345/163 |
| 5,479,192 | 12/1995 | Carroll, Jr. et al. | 345/157 |
| 5,528,523 | 6/1996 | Yoshida | 345/157 |
| 5,644,126 | 7/1997 | Ogawa | 345/157 |

Primary Examiner—Richard Hjerpe
Assistant Examiner—Kent Cang

[57] ABSTRACT

A monitor cursor controlling device provided with a signaling element, includes a cursor controlling unit, which is used for controlling a position of a cursor on a monitor of a computer, including an operating interface, generating an electrical signal in accordance with a manipulation motion performed by a user; a controller electrically connected to the operation interface, receiving and processing the electrical signal to generate a cursor controlling signal for controlling the movement of the cursor on the monitor; a signaling element electrically connected to the controller, and generating a perceivable signal for the user in response to an enabling signal generated by the controller, and a detecting memos electrically connected to the controller for receiving the cursor controlling signal to execute a cursor controlling operation, and having the controller to generate the enabling signal when at least one of a distance the cursor is moved on the monitor and a period of operation time of the device is greater than a preset value.

7 Claims, 2 Drawing Sheets

MONITOR CURSOR CONTROLLING DEVICE PROVIDED WITH SIGNALING ELEMENT

FIELD OF THE INVENTION

The present invention is related to a monitor cursor controlling device, especially to a monitor cursor controlling device provided with a signaling element.

BACKGROUND OF THE INVENTION

The cursor controlling device, such as mouse, track ball, . . etc., is a very important peripheral apparatus for the computer. In addition, it is also an essential auxiliary apparatus utilized for data processing. Hence, when the computer is equipped with a cursor controlling device, the user is capable of controlling easily the position of the cursor on a monitor, and processing a great deal of data. However, upon manipulating the cursor controlling device, e.g. a mouse, for a long-term period, the user's hand might feel uncomfortable owing to the fact that his hand has to be crooked somehow for operating the mouse, and thus the working performance might be reduced. Therefore, both of the user's comfort and the working performance have to be taken into considerations.

SUMMARY OF THE PRESENT INVENTION

The object of the present invention is to provide a monitor cursor controlling device which is capable of detecting the period of the operation time and the laborious extent or the working amount the user has done. Moreover, an opportune reminding signal is generated to remind the user to rest for a little while in order to optimize the user's comfort and the working performance.

In accordance with the present invention, a monitor cursor controlling device provided with a signaling element, comprising: a cursor controlling unit, which is used for controlling a position of a cursor on a monitor of a computer, including an operating interface, generating an electrical signal in accordance with a manipulation motion performed by a user; a controller electrically connected to the operation interface, receiving and processing the electrical signal to generate a cursor controlling signal for controlling the movement of the cursor on the monitor; a signaling element electrically connected to the controller, and generating a perceivable signal for the user in response to an enabling signal generated by the controller; and a detecting means electrically connected to the controller for receiving the cursor controlling signal to execute an cursor controlling operation, and having the controller to generate the enabling signal when at least one of a distance the cursor is moved on the monitor and a period of operation time of the device is greater than a preset value.

In accordance with another aspect of the present invention, the detecting mean includes a central processing unit (CPU) and a software means.

In accordance with another aspect of the present invention, the software means is a computer program.

In accordance with another aspect of the present invention, the signaling element is a light emitting diode (LED), and the perceivable signal is a light signal.

In accordance with another aspect of the present invention, the signaling element is a buzzer, and the perceivable signal is a sound signal.

In accordance with another aspect of the present invention, the signaling element is a vibrating actuator, the perceivable signal is a vibrating signal generated from the vibrating actuator.

In accordance with another aspect of the present invention, the monitor cursor controlling device is a mouse.

The present invention may be best understood through the following description with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1:
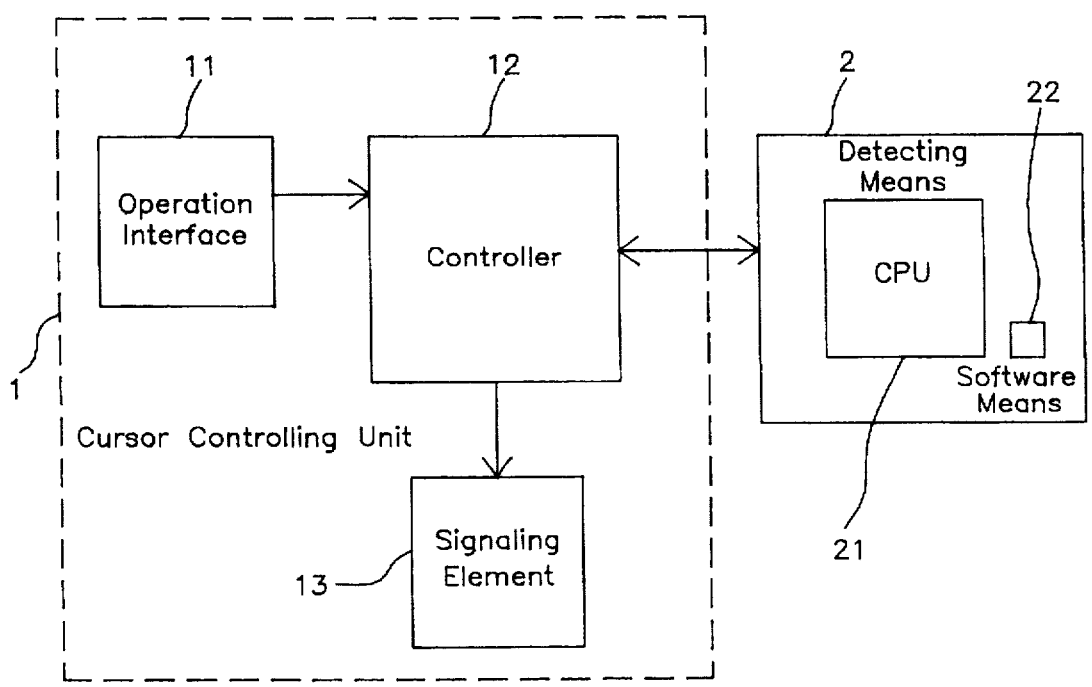
FIG. 1 is a block diagram showing the relationships among the components of a preferred embodiment of a monitor cursor controlling device according to the present invention.

Please refer to FIG. 1 which is a block diagram showing the relationships among the components of a preferred embodiment of a monitor cursor controlling device according to the present invention. The monitor cursor controlling device comprises a cursor controlling unit 1 together with detecting means 2, wherein the cursor controlling unit 1 further includes an operation interface 11, a controller 12 and a signaling element 13. The cursor controlling unit 1 employed in the preferred embodiment of the present invention is a mouse. In addition, the operation interface 11 utilized in the preferred embodiment of the present invention includes elements such as a rolling ball, grid wheels, photo transistors and light emitting diodes (LED). Furthermore, the present invention is capable of converting the displacement caused by the movement thereof in response to the manipulation of the user into an electric signal through the operation interface 11. The electrical signal for controlling the cursor is generated via a photo-electric conversion procedure performed in the operation interface 11, and the electric signal for controlling the cursor is processed thereafter by the controller 12 in order to generate a digital signal serving as a cursor controlling signal provided for the detecting means 2 to control the position of the cursor on the monitor. Meanwhile, the detecting means 2 is also detecting the operation situation of the cursor controlling unit 1.

The detecting means 2 employed in the preferred embodiment of the present invention is a computer including a central processing unit (CPU) 21 together with software means 22 which can be a computer program. As the detecting means 2 is in operation, the detecting means 2 measures the distance the cursor is moved on the monitor according to an accumulated value representing the bit number of the cursor shift data, and/or measures the period the operation interface has been in operation by detecting whether there is any shift data inputted thereinto. If the accumulated value has been up to a value greater than a preset one or the period of the continuous operation time of the operation interface 11 has been over a predetermined term, the CPU 21 will output a notifying signal to the controller 12. Of course, the definition of "continuous" operation may vary according to the practical requirement. For example, only a few seconds of motionless state during the operation of the operation interface 11 can be considered that the operation interface is still in a "continuous" operation state.

The controller 12 used in the preferred embodiment of the present invention can be an application specific integrated circuit (ASIC) or a micro-controller, which generates an enabling signal for the signaling element 13 in response to the notifying signal from the CPU 21. The signaling element 13 then generates a perceivable signal for the user according to the enabling signal generated by the controller 12.

The function of the signaling element 13 is to generate a perceivable signal for the user in response to the enabling signal, in order to remind the user to take a rest for preventing his/her hand from excessive fatigue. This perceivable signal could be a light signal, a sound signal, or a vibrating signal, and the signaling element 13 used in the present invention could be a light emitting diode (LED), a buzzer, or a vibration actuator according to the desired signal types as aforementioned.

Figure 2:
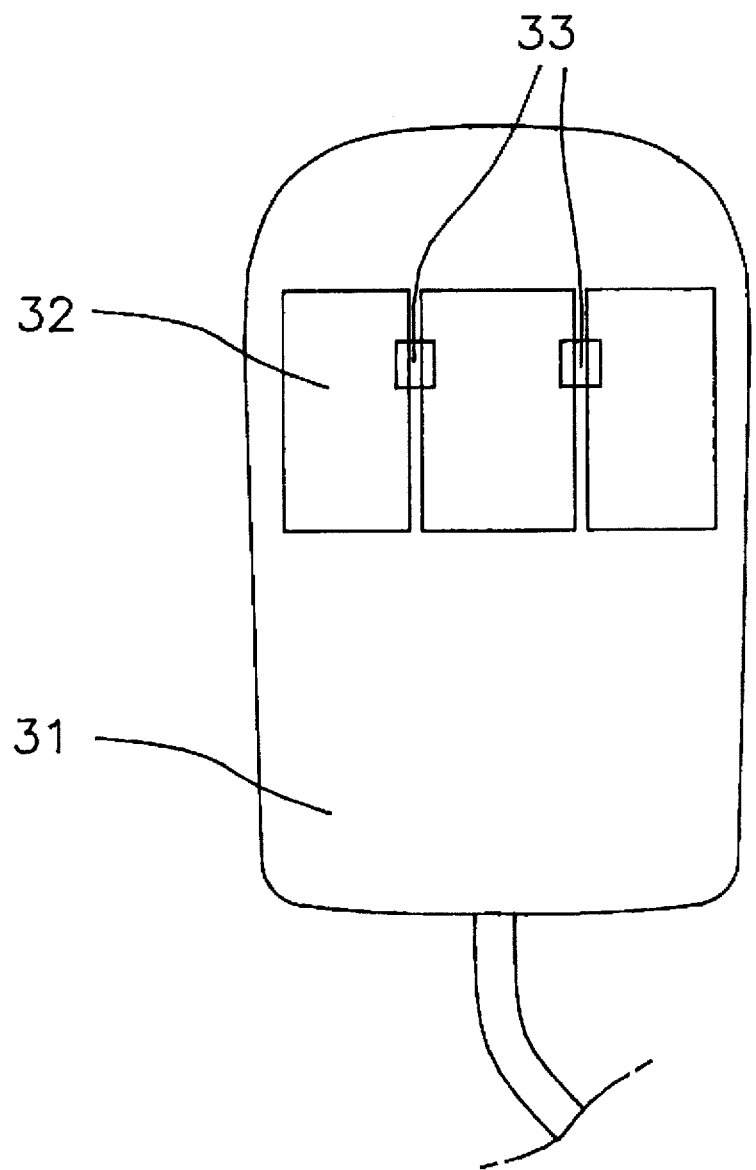
FIG. 2 is a schematic appearance diagram of a preferred embodiment of a monitor cursor controlling device according to the present invention.

Please refer to FIG. 2, which is a schematic appearance diagram of a preferred embodiment of a monitor cursor controlling device according to the present invention. It is a computer mouse provided with the function of noticing the operation status to the user, wherein light emitting diodes (LED) 33 are employed as a signaling element and disposed between the frame 31 of the mouse and the click switches 32. When the mouse is in operation, the illuminating status of the LED 33, which are positioned between fingers of the user, is visible.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitor cursor controlling device provided with a signaling element, comprising:
    a cursor controlling unit, which is used for controlling a position of a cursor on a monitor of a computer, including
        an operating interface, generating an electrical signal in accordance with a manipulation motion performed by a user;
        a controller electrically connected to said operation interface, receiving and processing said electrical signal to generate a cursor controlling signal for controlling the movement of said cursor on said monitor; and
        a signaling element electrically connected to said controller, and generating a perceivable signal for said user in response to an enabling signal generated by said controller; and
    a detecting means electrically connected to said controller for receiving said cursor controlling signal to execute a cursor controlling operation, and having said controller to generate said enabling signal when at least one of a distance said cursor is moved on said monitor and a period of operation time of said device is greater than a preset value.

2. A device according to claim 1, wherein said detecting means includes a central processing unit (CPU) and a software means.

3. A device according to claim 2, wherein said software means is a computer program.

4. A device according to claim 1, wherein said signaling element is a light emitting diode (LED), and said perceivable signal is a light signal.

5. A device according to claim 1, wherein said signaling element is a buzzer, and said perceivable signal is a sound signal.

6. A device according to claim 1, wherein said signaling element is a vibrating actuator, and said perceivable signal is a vibrating signal generated from said vibrating actuator.

7. A device according to claim 1, wherein said monitor cursor controlling device is a mouse.

* * * * *